United States Patent [19]

Doty

[11] 4,151,907
[45] May 1, 1979

[54] WALKING BEAM CONVEYOR

[75] Inventor: Myron L. Doty, Indianapolis, Ind.

[73] Assignee: Moorfeed Corporation, Indianapolis, Ind.

[21] Appl. No.: 696,539

[22] Filed: Jun. 16, 1976

[51] Int. Cl.² ............................................. B65G 25/00
[52] U.S. Cl. .................................................... 198/774
[58] Field of Search ............................... 198/774, 773

[56] References Cited

U.S. PATENT DOCUMENTS

| 2,731,139 | 1/1956 | Smith | 198/774 |
| 3,687,275 | 8/1972 | Broser | 198/774 |

*Primary Examiner*—Joseph E. Valenza
*Attorney, Agent, or Firm*—Jenkins, Coffey & Hyland

[57] ABSTRACT

A walking beam conveyor having a cam at only one of its ends. The conveyor includes a framework, a longitudinally extending beam having proximal and distal ends, and a plurality of supports freely pivotally mounted in the framework for supporting the beam. The supports carry the beam in such a manner as to allow the beam to move longitudinally of the conveyor with respect to the supports. A first follower, movably mounted in the framework, follows the cam and a first linkage apparatus connects the first follower to the supports. The supports pivot about their connections to the framework in response to movement of the first follower to move the beam transversely of the conveyor, e.g., vertically. The supports engage an equal plurality of beam guides to which the beam is attached. A second follower, also movably supported in the framework, and second linkage apparatus coupled to the second follower and the beam, move the beam longitudinally of the conveyor, e.g., horizontally.

3 Claims, 4 Drawing Figures

WALKING BEAM CONVEYOR

This invention deals with conveyors such as those used to move parts along, for example, assembly lines. More specifically, this invention deals with conveyors of the type known as walking beam conveyors.

Several types of walking beam conveyors are known in the art. Generally, such conveyors have two barrel cams, the rotation of which cams is synchronized. The barrel cams are located at opposite ends of the walking beam. The synchronous rotation of the two barrel cams causes a "walking" or orbital movement of the beam along a closed path. The path of the movement is determined by the patterns of the particular cams used. The cams of such barrel cam-type walking beam conveyors are frequently complex devices. Some such devices require one cam track on each barrel cam to control the movement of the beam longitudinally of the conveyor and a separate track for beam movement transverse to the conveyor. The drives necessary to synchronize the motions of the barrel cams at either end of such conveyors generally are also complex and sophisticated. Further, if there is any difference in the patterns of the cams, the cams will act against one another, causing wear and fatigue to the cams or to the beam through which they act. The beams of such conveyors must be quite sturdy if the conveyors are to be of any appreciable length. Such sturdiness is required because the beams are supported only at their ends by the cams. The requirement that the beams be sturdy to prevent excessive flexure and fatigue generally dictates that the beams be more massive. The increased mass of such beams increases the load on the cam surfaces and makes it more difficult to overcome the inertia of such beams. Thus it is difficult to make such walking beam conveyors which can move at speeds sufficient to convey substantial numbers of parts.

It is an object of the present invention to provide a simple cam-driven walking beam conveyor which is driven by a single cam at one end of the conveyor. The conveyor thus requires no synchronization of cams at its ends.

According to the invention, a walking beam conveyor includes a framework, a longitudinally extending beam having a proximal end and a distal end, and a cam for actuating the beam for movement in a closed plane path. The cam has an axis of rotation which is generally transverse to the longitudinal extent of the beam. First and second cam followers engage the cam. First motion-transmitting linkage means are provided for coupling the first follower to the beam. A plurality of beam supports slidingly engage and support the beam to allow the beam to move freely generally longitudinally with respect to the supports. The supports are movably supported by the framework and are connected to first linkage means. The first linkage means are coupled to the first follower. Rotation of the cam imparts a predetermined transverse component to the pathwise motion of the beam. The supports are disposed intermediate the proximal and distal ends of the beam. Second linkage means are coupled to the second follower and to the beam to impart a predetermined longitudinal component to the pathwise motion of the beam in response to rotation of the cam.

In the illustrated embodiment of the invention, the cam is a positive-motion cam having a grooved axially facing surface. The first and second followers both follow the same groove in the axially facing surface. As the cam revolves, the bar moves in a rectangular path in a vertical plane extending longitudinally of the bar.

Further, according to the illustrated embodiment, the first and second followers are pivotally supported upon the framework. The second linkage means includes means coupled to the second follower and to the beam adjacent its proximal end. The first linkage means includes a tie member coupled between each adjacent pair of supports along the longitudinal extent of the beam. At least one of the supports is also coupled to the first cam follower and is driven thereby to move all of the supports in synchronism. The beam is thus driven transversely by each support.

The invention may best be understood by referring to the following description and accompanying drawings which illustrate an embodiment of the invention. In such drawings.

Figure 1:
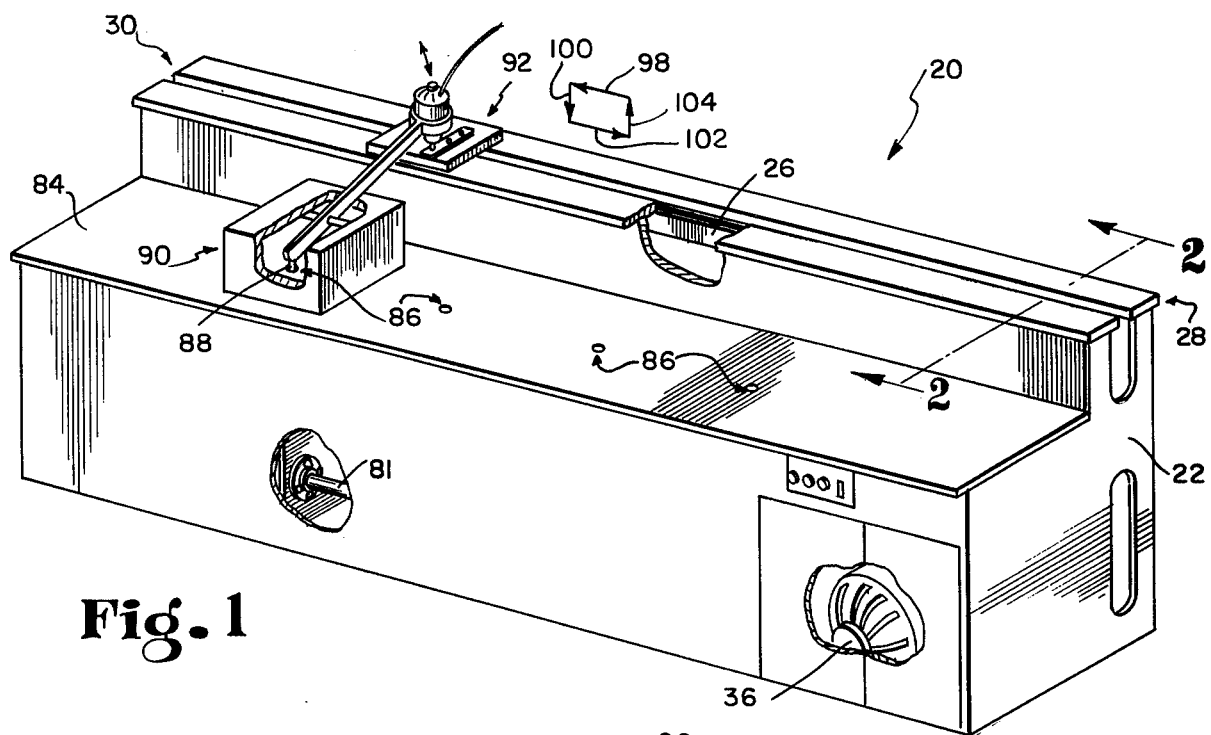
FIG. 1 is a partly fragmentary perspective view of a walking beam conveyor constructed in accordance with the present invention.
Figure 2:
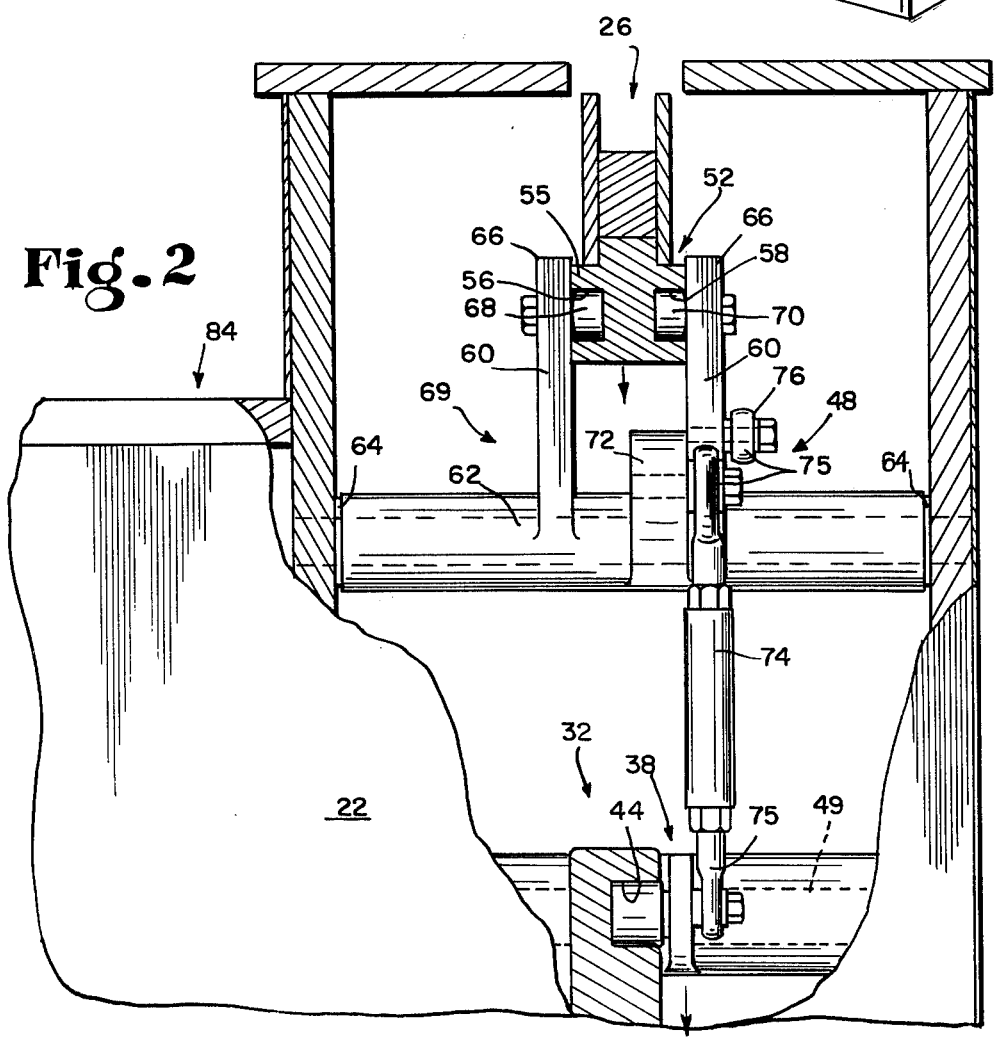
FIG. 2 is a partly fragmentary sectional view of the conveyor of FIG. 1, taken along section lines 2—2 thereof.
Figure 3:
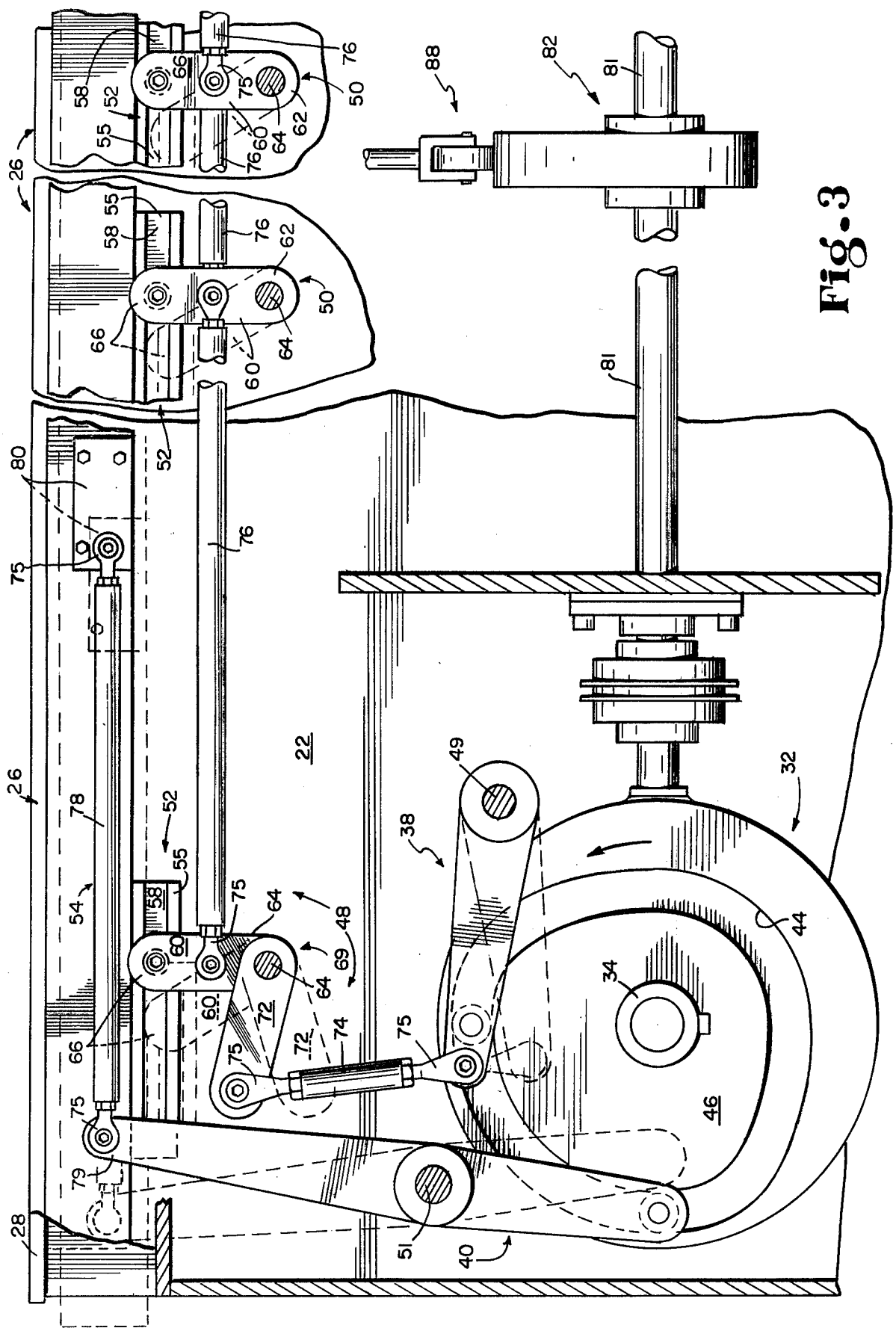
FIG. 3 is a partly fragmentary side elevational view of the conveyor of FIGS. 1–2, the solid and broken lines in FIG. 3 representing the extremes of motion of the beam, the followers, and support members of the embodiment of FIGS. 1–3; and, FIG. 4 is a fragmentary view of another embodiment of the conveyor of the present invention.

In FIGS. 1–3, a walking beam conveyor 20 includes a framework 22 and a longitudinally extending beam 26. Beam 26 is driven in a closed plane path by a positive-motion cam 32 (FIG. 3). Cam 32 is disposed upon a drive shaft 34. Drive shaft 34 is turned by a prime mover 36 which is supported on framework 22. First and second followers 38, 40, respectively, engage a groove 44 on an axially facing surface 46 of cam 32. First linkage means 48 is coupled to follower 38 and to a plurality of supports 50 disposed intermediate the proximal and distal ends 28, 30 (FIG. 1), respectively, of beam 26. Supports 50 engage an equal plurality of beam guides 52 positioned along beam 26.

Second linkage means 54 is coupled between follower 40 and beam 26. Follower 40 drives the beam longitudinally, e.g., horizontally, through second linkage means 54 as cam 32 revolves. Follower 38 drives the beam 26 transversely of the conveyor, e.g., vertically, through first linkage members 48, supports 50 and beam guides 52, as cam 32 revolves. The vertical and horizontal components of beam motion which result define the closed plane path which the beam describes as cam 32 revolves. Followers 38, 40 which drive the beam vertically and horizontally, respectively, are pivotally supported from framework 22 upon shafts 49, 51, respectively.

Each of beam guides 52 comprises a bracket 55 having a generally I-shaped cross section suitably attached, e.g., by welding, to the underside of beam 26. Each bracket 55 thereby presents two oppositely, transversely opening, longitudinally extending grooves 56, 58. Each of supports 50 comprises a pair of crank arms 60. Each pair of crank arms 60 is attached at a proximal end to a shaft 62 which is pivotally attached at its ends 64 to framework 22 beneath a respective one of beam guides 52. The distal ends 66 of crank arms 60 are provided with bearings 68, 70 (FIG. 2) which engage the oppositely opening grooves 56, 58, respectively, in beam guides 52.

In this manner, supports 50 support beam 26 to allow it to move longitudinally with respect to such supports 50. Further, the pivotal mounting of supports 50 on shafts 64 allows beam 26 to move transversely of conveyor 20, i.e., vertically, as indicated by the broken line representations of supports 50 and beam guides 52 in FIG. 3, as supports 50 pivot on their respective shafts 64.

A selected one 69 of supports 50 adjacent the proximal end 28 of the beam includes an additional crank arm 72. Crank arm 72 is attached to follower 38 by a linkage member 74, the ends of which are provided with suitable connectors 75 which may be, for example, ball joints. Follower 38 and linkage member 74 act through crank arm 72 to pivot end support 68 on its shaft 64.

Successive adjacent supports 50, 69 along the longitudinal extent of the conveyor 20 are connected together by a plurality of tie members 76, the ends of which are equipped with connectors 75. Tie members 76 provide for synchronous pivotal movement of all of the supports 50 on their respective shafts 64 as follower 38 is moved by groove 44. Thus, all of the supports 50, 69 lift the various portions of the beam 26 which they support through beam guides 52 in synchronism as cam 32 revolves.

Second linkage means 54 comprises a link member 78, the ends of which are equipped with connectors 75. Link member 78 is connected at one end to the distal end 79 of follower 40. The other end of link member 78 is connected to a bracket 80 which is attached to beam 26. Movement of distal end 79 of follower 40 between its position illustrated in solid lines in FIG. 3 and its position illustrated in broken lines there causes horizontal reciprocation of beam 26.

In addition to driving cam 32, prime mover 36 can provide synchronized drive for a power take-off shaft 81. One or more suitable cams 82 (FIG. 3) can be mounted on shaft 81 beneath a table-top work surface 84 of conveyor 20 at each of several successive work stations 86 longitudinally along the conveyor. At each of these work stations 86, cams 82 can actuate, through pushrods 88, for example, machinery 90. Machinery 90 can then perform any of the various operations to be performed on the items 92 which are being conveyed along conveyor 20 by the walking motion of beam 26. Since beam 26 executes a forward longitudinal "stroke" in the direction of arrow 98 (FIG. 1) only once in every 360° of revolution of cam 32 (and only once in every 360° of rotation of shaft 80), there remain 270° of rotation of cam 32 and shaft 80 in which such operations can be performed. During these 270° of rotation, beam 26 executes, respectively, a downward stroke, in the direction of arrow 100, a stroke toward proximal end 28 of conveyor 20, in the direction of arrow 102, and an upward stroke, in the direction of arrow 104. Shaft 81 can be geared to rotate, for example, twice for each revolution of cam 32 so that more than one operation can be performed at each work station between forward strokes of beam 26 which result in motion of a workpiece or article along conveyor 20.

It may be seen that the longitudinal component of motion of beam 26 is independent of the transverse, i.e., vertical, component of motion. The pattern of groove 44 can be selected so that the beam will describe any desired closed path in its "walking" motion. This walking motion, or orbit, described by the beam in a plane parallel to its longitudinal extent allows the beam to traverse its closed path once in response to a single revolution of cam 32. With the illustrated pattern of groove 44, the path described by beam 26 is a rectangle as previously mentioned. The pattern can be selected to allow a predetermined amount of "dwell," or pause, by beam 26 at each corner of the rectangle.

Although the motion has been described as being in a vertical plane, it is understood that the beam can describe an orbit in a horizontal plane or some other plane by properly orienting the cam, followers and support member pivotal axes.

Figure 4:
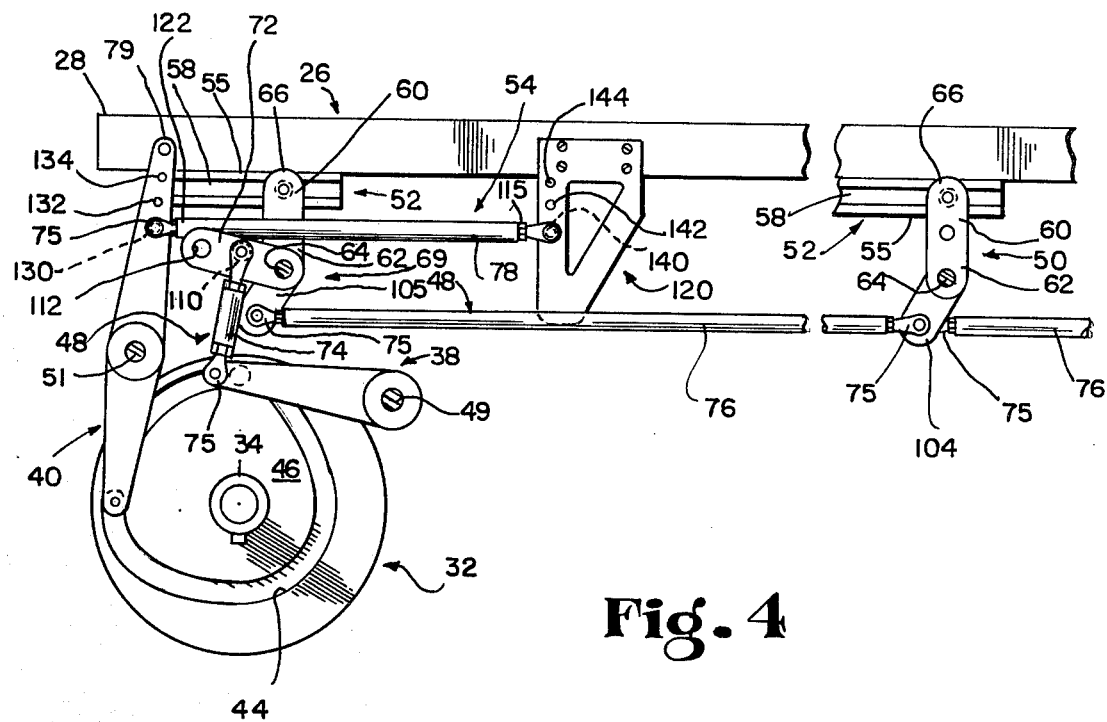

In the embodiment of the invention illustrated in FIG. 4, those elements which are numbered identically with the elements in the embodiment of FIGS. 1-3 perform the same or similar functions. In FIG. 4, follower 38 is connected to one end of link member 74 as in the preceding embodiment. In this embodiment, however, it is to be noted that support members 50, 69 have been modified somewhat by the addition of depending crank arms 104, 105, respectively, to which tie members 76 are attached.

The remaining end of link member 74 can be connected by its connecting member 75 selectively to either one of two holes 110, 112 on crank arm 72. When such connector 75 is engaged in hole 110 of crank 72, a first vertical (upward and downward) stroke of beam 26 results as the motion of follower 38 is transmitted through crank arm 72 to support member 69 and to successive support members 50 along the conveyor by tie members 76. When connecting member 75 is engaged in hole 112, a second and shorter vertical stroke of beam 26 results, owing to the longer effective radius of crank arm 72 through which follower 38 must act as crank arm 105 is moved.

In this embodiment, tie member 78 is attached by a connector 75 at its distal end 115 to a bracket 120 which is bolted or otherwise securely attached to beam 26. Tie member 78 is attached at its proximal end 122 by a connector 75 to follower 40. Follower 40 contains a series of holes 130, 132, 134 near its distal end 79. Bracket 120 includes a similar series of holes 140, 142, 144. These holes are adapted to receive connectors 75 at ends 122, 115, respectively. Connecting tie member 78 between holes 130, 140 produces a horizontal motion of beam 26 having a first length. Connecting tie member 78 between holes 132, 142 causes beam 26 to execute a second and slightly longer stroke. Finally, connecting tie member 78 between holes 134, 144, produces a third and longer longitudinal stroke of beam 26. Thus, it may be seen that in this embodiment, both the vertical and horizontal strokes of beam 26 are adjustable to suit the requirements of a particular application.

What is claimed is:

1. In a walking beam conveyor comprising a framework, a longitudinally extending beam having proximal and distal ends, and means for supporting the beam and for moving the beam in a closed path, the improvement wherein the beam supporting and moving means comprises means for supporting the beam for movement with respect to the framework, the support means being movably coupled to the framework and the beam, a positive motion cam having an axis of rotation extending transversely of the beam and a face including surfaces defining at least one axially facing cam groove, first means for following the cam, first linkage means for connecting the first following means to the support means to move the support means in response to motion of the first following means, second means for following said cam, and second linkage means for connecting the second following means to the beam to move the beam in response to motion of the second following means, the cam, the first following means, the first linkage means and the support means cooperating to impart a predetermined transverse component to the motion of the beam, the cam, the second following means and second linkage means cooperating to impart a predetermined longitudinal component to the motion of the beam, and beam guide means comprising means defining a plurality of longitudinally extending, transversely opening grooves in the beam, the support means including a plurality of crank members, each crank member having a proximal end pivotally coupled to the framework for movement with respect thereto and a distal end including bearing means for extending into a respective one of said grooves to support said beam for movement longitudinally with respect to said crank members, and means for connecting the crank members of each pair so that they pivot together, the first linkage means including first links extending longitudinally of the beam between adjacent pairs of crank members and pivotally attached at their ends to the adjacent crank members, the first linkage means further including a third arm having a proximal end connected to one of the crank members and a distal end remote therefrom, and a second link member coupled between the first follower means and the third arm, the second link member being adjustably coupled to the third arm intermediate the proximal and distal ends thereof to vary selectively the throw of the third arm, thereby varying the distance travelled by the beam transverse to its longitudinal extent.

2. In a walking beam conveyor comprising a framework, a longitudinally extending beam having proximal and distal ends, and means for supporting the beam and for moving the beam in a closed path, the improvement wherein the beam supporting and moving means comprises means for supporting the beam for movement with respect to the framework, the support means being movably coupled to the framework and the beam, a positive motion cam having an axis of rotation extending transversely of the beam and a face including surfaces defining at least one axially facing cam groove, first means for following the cam, first linkage means for connecting the first following means to the support means to move the support means in response to motion of the first following means, second means for following said cam, and second linkage means for connecting the second following means to the beam to move the beam in response to motion of the second following means, the cam, the first following means, the first linkage means and the support means cooperating to impart a predetermined transverse component to the motion of the beam, the cam, the second following means and second linkage means cooperating to impart a predetermined longitudinal component to the motion of the beam, and beam guide means comprising means defining a plurality of longitudinally extending, transversely opening grooves in the beam, the support means including a plurality of crank members, each crank member having a proximal end pivotally coupled to the framework for movement with respect thereto and a distal end including bearing means for extending into a respective one of said grooves to support said beam for movement longitudinally with respect to said crank members, and means for connecting the crank members of each pair so that they pivot together, the first linkage means including a third arm having a proximal end connected to each pair of crank members and a distal end remote therefrom, and first links extending longitudinally of the beam between adjacent third arms and pivotally attached at their ends to the adjacent third arms, the first linkage means further comprising a fourth arm having a proximal end connected to one of the crank members, and a distal end, and a second link member coupled between the first follower means and the fourth arm, the second link member being adjustably coupled to the fourth arm intermediate the proximal and distal ends thereof to vary selectively the throw of the fourth arm, thereby varying the distance travelled by the beam transverse to its longitudinal extent.

3. In a walking beam conveyor comprising a framework, a longitudinally extending beam having proximal and distal ends, and means for supporting the beam and for moving the beam in a closed path, the improvement wherein the beam supporting and moving means comprises means for supporting the beam for movement with respect to the framework, the support means being movably coupled to the framework and the beam, a positive motion cam having an axis of rotation extending transversely of the beam and a face including surfaces defining at least one axially facing cam groove, first means for following the cam, first linkage means for connecting the first following means to the support means to move the support means in response to motion of the first following means, second means for following said cam, and second linkage means for connecting the second following means to the beam to move the beam in response to motion of the second following means, the cam, the first following means, the first linkage means and the support means cooperating to impart a predetermined transverse component to the motion of the beam, the cam, the second following means and second linkage means cooperating to impart a predetermined longitudinal component to the motion of the beam, the second following means comprising a second follower having proximal, intermediate and distal end portions, the proximal end portion including means for engaging the cam groove, the intermediate portion including means for pivotally mounting the second follower from the framework and the distal end portion including means connected to the second linkage means, and the second linkage means being adjustably coupled to the distal end portion of the second follower to vary selectively the longitudinal distance moved by the beam, and beam guide means comprising means defining a plurality of longitudinally extending, transversely opening grooves in the beam, the support means including a plurality of crank members, each crank member having a proximal end pivotally coupled to the framework for movement with respect thereto and a distal end including bearing means for extending into a respective one of said grooves to support said beam for movement longitudinally with respect to said crank members.

* * * * *